United States Patent
Brown et al.

(10) Patent No.: US 8,277,154 B2
(45) Date of Patent: Oct. 2, 2012

(54) ADAPTIVE THRUST SENSOR DRILLING

(75) Inventors: Robert Allen Brown, Seattle, WA (US); Lance O. McCann, Montlake Terrace, WA (US); Paul R. Arntson, Bothell, WA (US)

(73) Assignee: The Boeing Company, Chicago, IL (US)

( * ) Notice: Subject to any disclaimer, the term of this patent is extended or adjusted under 35 U.S.C. 154(b) by 1158 days.

(21) Appl. No.: 12/130,008

(22) Filed: May 30, 2008

(65) Prior Publication Data

US 2009/0297284 A1 Dec. 3, 2009

(51) Int. Cl.
B23B 35/00 (2006.01)
(52) U.S. Cl. .................. 408/1 R; 408/10; 408/17
(58) Field of Classification Search .................. 408/1 R, 408/10, 12, 9, 11, 8, 14, 15, 17, 129
See application file for complete search history.

(56) References Cited

U.S. PATENT DOCUMENTS

| | | | | |
|---|---|---|---|---|
| 3,259,023 A | * | 7/1966 | Rieger et al. | 409/187 |
| 3,418,549 A | * | 12/1968 | Emerson et al. | 318/39 |
| 4,157,231 A | * | 6/1979 | Phillips | 408/1 R |
| 4,165,789 A | | 8/1979 | Rogers | |
| 4,195,699 A | | 4/1980 | Rogers et al. | |
| 4,198,180 A | | 4/1980 | Schultz | |
| 4,346,444 A | * | 8/1982 | Schneider et al. | 700/173 |
| 4,644,335 A | * | 2/1987 | Wen | 340/683 |
| 4,688,970 A | * | 8/1987 | Eckman | 408/9 |
| 4,745,557 A | * | 5/1988 | Pekar et al. | 700/188 |
| 4,807,353 A | * | 2/1989 | Corson et al. | 483/10 |
| 5,022,798 A | | 6/1991 | Eckman | |
| 5,116,168 A | | 5/1992 | Aihara | |
| 5,155,473 A | | 10/1992 | Oketani et al. | |
| 5,295,770 A | | 3/1994 | Pennison et al. | |
| 5,318,136 A | | 6/1994 | Rowsell et al. | |
| 5,328,302 A | | 7/1994 | Eckman | |
| 5,349,337 A | | 9/1994 | McCormick | |
| 6,650,960 B2 | * | 11/2003 | Kakino et al. | 700/173 |
| 2004/0049311 A1 | | 3/2004 | Kuntze et al. | |

FOREIGN PATENT DOCUMENTS

| | | |
|---|---|---|
| EP | 0339659 A2 | 11/1989 |
| EP | 1132789 A2 | 9/2001 |
| WO | 2006077340 A1 | 7/2006 |

OTHER PUBLICATIONS

EP Search report dated Aug. 7, 2010 for application EP09160591.

* cited by examiner

*Primary Examiner* — Daniel Howell
*Assistant Examiner* — Paul M Janeski
(74) *Attorney, Agent, or Firm* — Yee & Associates, P.C.

(57) ABSTRACT

A computer implemented method, apparatus, and computer usable program code for performing a drilling operation. The drilling apparatus comprises a housing, a spindle, a spindle motor, a thrust motor, a load sensor, and a controller. The spindle may be capable of receiving a drill bit. The spindle motor may be capable of turning the spindle at a set of different speeds during the drilling operation. The thrust motor may be capable of moving the spindle in an axial direction. The load sensor may be capable of detecting a reaction thrust force during the drilling operation to form a detected reaction thrust force. The controller may be capable of controlling the spindle motor and the thrust motor to change a drilling speed in response to changes in the detected reaction thrust force.

21 Claims, 10 Drawing Sheets

LAYER DEFINITIONS

```
906 — MaterialName="titanium"
908 — LayerNumber=2
912 — Thickness=0.5
914 — DeltaThrust=60
916 — PeckEnabled=1          902
918 — PeckIncrement=0.02
920 — PeckExtendMargin=0.02
922 — PeckDwell=0
924 — PeckRetract=0.1
_____
926 — MaterialName="graphite"
928 — LayerNumber=3
930 — Thickness=1.4
932 — DeltaThrust=0
934 — PeckEnabled=1          904
936 — PeckIncrement=0.12
938 — PeckExtendMargin=0.02
940 — PeckDwell=0
942 — PeckRetract=0.1
```

MATERIAL DEFINITIONS

```
1008 — MaterialName="graphite"
1010 — NormHardness=0.2
1012 — Ipr=0.003              1002
1014 — Rpm=800
_____
1016 — MaterialName="aluminum"
1018 — NormHardness=0.4
1020 — Ipr=0.003              1004
1022 — Rpm=2000
_____
1024 — MaterialName="titanium"
1026 — NormHardness=0.8
1028 — Ipr=0.002              1006
1030 — Rpm=400
```

ADAPTIVE THRUST SENSOR DRILLING

BACKGROUND INFORMATION

1. Field

The present disclosure relates generally to manufacturing and in particular to a method and apparatus for drilling holes. Still more particularly, the present disclosure relates to a method and apparatus for drilling a hole in a stack of materials.

2. Background

Manufacturing may involve the use of tools and/or labor to create items for use or sale. In aerospace manufacturing, these items may include, for example, without limitation, aircraft, aircraft parts, missiles, rockets, and/or spacecraft. In manufacturing various items, a number of different operations may be performed. For example, without limitation, these operations may include, extrusion, pressing, rolling, piercing, machining, drilling, routing, and curing.

With respect to drilling, a drill may be used to create holes or channels that are typically cylindrical in solid materials. A drill may be a tool with a rotating section that may hold a drill bit to drill holes. A drill bit may be a cutting tool used to create holes in an object. These holes may be, without limitation, cylindrical or non-cylindrical depending on the particular implementation. Drilling may involve drilling a channel, such as a cylindrical hole.

One type of drill that may be used for drilling holes may be a drill with a positive feed feature. This positive feed feature may allow the drill to push the drill bit into the object while drilling occurs. Drills also may be used in which the feed feature may be used to push the drill bit into the object and then retract the drill bit while drilling occurs. This type of forward and reverse motion of the drill bit may provide for a cleaner quality hole. Further, this type of drilling also may reduce the amount of heat applied to the object, which also may increase the quality of the hole.

This type of drilling may be performed with a stackup of materials. A stackup of materials is a set of materials. A set, as used herein, refers to one or more items. For example, a stackup of materials may be one or more layers of different types of materials. A stackup of materials may also be referred to as a stackup. When multiple layers are present in the stackup, one material may require drilling at a first speed, while another material may require drilling at a second speed. For example, without limitation, a titanium layer within the stackup may require a slower drilling speed as compared to a composite layer within the stackup. A stackup may often include a combination of relatively hard and soft layers of materials.

Drilling deep stackups having both hard and soft layers of materials may be very time consuming when the majority of the stackup contains soft materials. Some types of drilling apparatus may allow only for a single drilling speed. This drilling speed may be set prior to drilling into a stackup. With these types of systems, the drilling speed may be set to a slower speed for the set of layers having the hardest material. As a result, the time needed to drill through soft materials may also be increased because of the lower drilling speed. This increased time may occur because the drilling speed may be kept slow to account for a harder material even though the majority of the stackup contains a softer material which may be drilled at a faster speed. The spindle speed may be the speed at which the drill rotates the drill bit, and the feed rate may be the speed at which the drill may advance the drill bit into the material. In these examples, the thrust level may be the reaction force on the drill caused by the spindle speed and/or feed rate.

Other types of drilling apparatus may allow controlling the rotation of the spindle in the drilling apparatus. These types of drilling apparatus may use a mechanical mechanism to detect when a layer having a harder or softer material has been reached. In this type of drilling apparatus, a mechanical sensor may be used to detect changes in thrust levels. An example of a spring washer that may be used in currently available drilling apparatus is a Belleville washer. This type of washer may be used, for example, without limitation, in conjunction with an open air valve, which may change the speed of the drill when a harder material is encountered by the drilling apparatus.

A drawback with this type of washer is that adjustments to the drilling speeds may have to be made constantly because as the drill bit wears, the thrust level applied to the stackup may change.

Therefore, it would be advantageous to have a method and apparatus that overcomes the problem above in drilling holes into a stackup.

SUMMARY

The advantageous embodiments provide a computer implemented method, apparatus, and computer usable program code for performing a drilling operation. The drilling apparatus comprises a housing, a spindle, a spindle motor, a thrust motor, a load sensor, and a controller. The spindle may be capable of receiving a drill bit. The spindle motor may be capable of turning the spindle at a set of different speeds during the drilling operation. The thrust motor may be capable of moving the spindle in an axial direction. The load sensor may be capable of detecting a reaction thrust force during the drilling operation to form a detected reaction thrust force. The controller may be capable of controlling the spindle motor and the thrust motor to change a drilling speed in response to changes in the detected reaction thrust force.

In another advantageous embodiment, an apparatus is provided for performing a drilling operation on a stackup of materials for an aircraft. The spindle may be capable of receiving a drill bit, wherein the spindle has a base. The spindle motor may be capable of turning the spindle at a set of different speeds during a drilling operation, wherein a drilling speed comprises at least one of a speed at which the spindle turns and a speed at which a thrust motor moves the spindle in an axial direction. The thrust motor may be capable of moving the spindle in the axial direction, wherein the thrust motor may have a positive rotary speed when the thrust motor moves the spindle axially away from the base, a neutral rotary speed when the thrust motor does not move the spindle, and a negative rotary speed when the thrust motor moves the spindle axially towards the base. The load sensor may be capable of detecting a reaction thrust force during the drilling operation to form a detected reaction thrust force, wherein the load sensor may be located around the base. The controller may be capable of controlling the spindle motor and the thrust motor to change the drilling speed in response to changes in the detected reaction thrust force. Program code may be executable by the controller to change the drilling speed during the drilling operation, wherein the program code comprises a process, layer definitions, and material definitions. The layer definitions may define a set of layers in a stackup for the drilling operation, a change in the reactive thrust force indicating when a new layer is reached in the set of layers, and a thickness of a layer used to identify a distance for performing the drilling operation when a change in the detected reaction thrust force is not used to control the drilling speed. The material definitions may define the drilling speed for a material in the material definitions and a normalized hardness used to identify a layer transition within the set of layers.

In yet another advantageous embodiment, a method identifies a current layer in a plurality of layers in the stackup. The method controls a drilling speed for the drilling operation based on a material in the current layer being drilled. The method monitors a reactive thrust force during the drilling operation. The method identifies a new layer in response to a change in the reactive thrust force indicating the new layer, wherein the new layer becomes the current layer in the drilling operation.

In still yet another advantageous embodiment, a method may be used to perform drilling operations. A current layer in a plurality of layers in a stackup may be identified using layer definitions. A drilling speed may be selected for the materials in the current layer from material definitions for the plurality of layers to form a selected drilling speed causing a spindle to move at the selected drilling speed using the selected drilling speed, wherein the drilling speed for a drilling operation based on a material in the current layer being drilled includes a speed at which the spindle turns and controlling a speed at which the spindle moves axially. A reactive thrust force may be monitored during the drilling operation. A new layer is identified in response to a change in the reactive thrust force indicating the new layer, wherein the new layer becomes the current layer in the drilling operation. The drilling operation may end when all of the plurality of layers has been drilled. The drilling speed of the drilling operation may be controlled based on a distance that a drill bit has traveled into the stackup if changes in the reactive thrust force are not used to control the drilling speed. A speed at which the spindle moves axially may be controlled to perform a peck operation.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 9 is a diagram of layer definitions in accordance with an advantageous embodiment;

FIG. 10 is a diagram illustrating material definitions in accordance with an advantageous embodiment;

DETAILED DESCRIPTION

Figure 1:
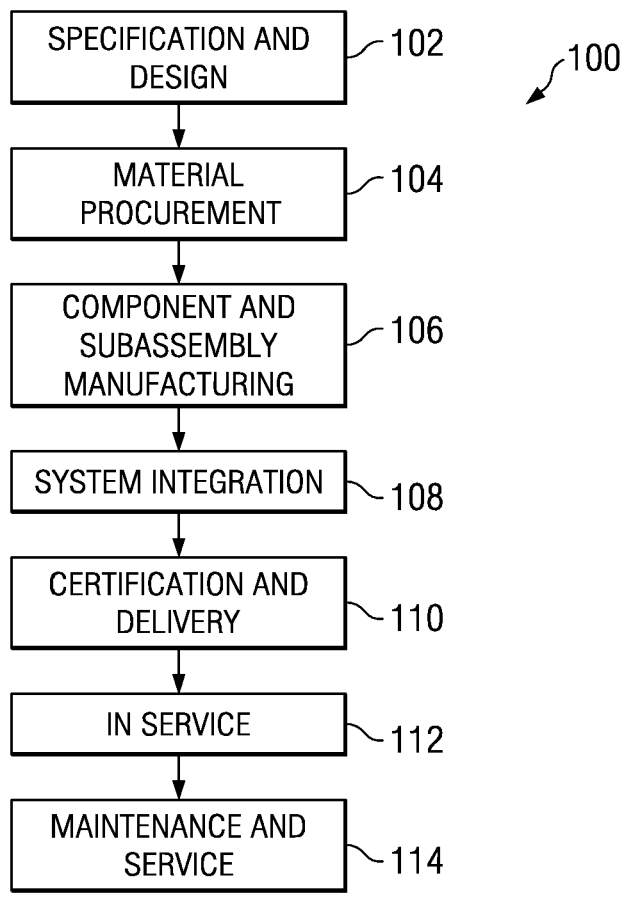
FIG. 1 is diagram illustrating an aircraft manufacturing and service method in which an advantageous embodiment may be implemented.
Figure 2:
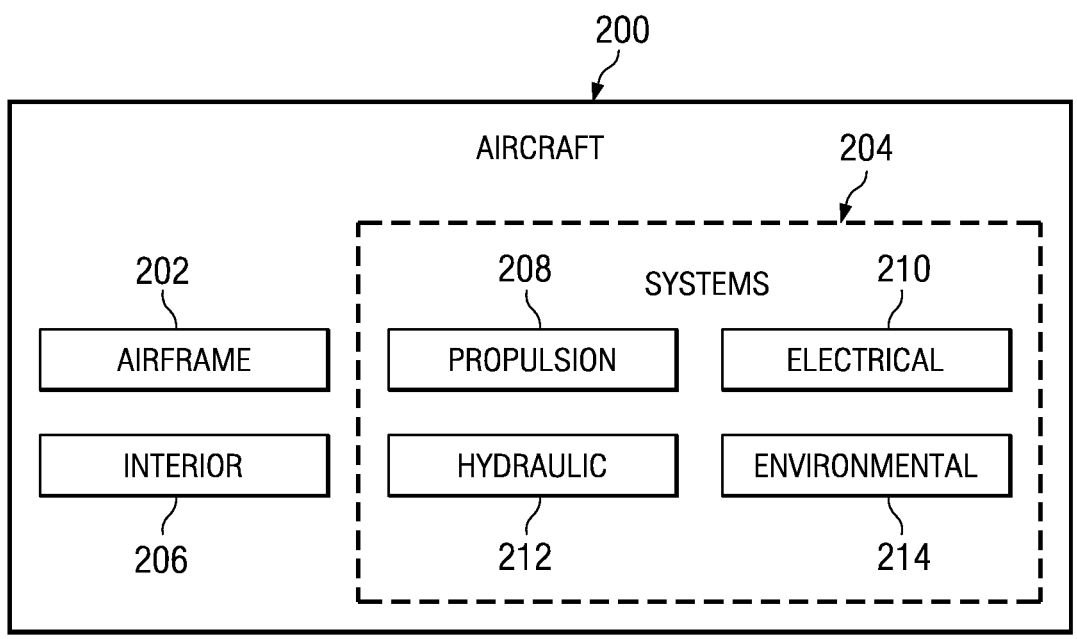
FIG. 2 is a diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment.

During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place.

Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, by substantially expediting the assembly of or reducing the cost of aircraft 200. Similarly, one or more of apparatus embodiments, method embodiments, or a combination thereof may be utilized while aircraft 200 is in service 112, for example and without limitation, to maintenance and service 114 in FIG. 1.

The different advantageous embodiments recognize that currently used numerically controlled machines for drilling may be programmed to follow a preprogram path of drilling speeds. These drilling speeds may include the speed at which the spindle turns and the speed at which the spindle is moved towards and/or away from a stackup. The speed at which the spindle turns may be measured in revolutions per minute. The speed at which the spindle moves towards or away from a stackup may be referred to as a feed rate.

The different advantageous embodiments take into account that currently used apparatus may be unable to adapt to an unpredictable material and/or air gap thickness. The different advantageous embodiments also take into account that currently used apparatus make measurements in terms of actual reactive thrust force, which may change over time as a drill bit wears.

Thus, the different advantageous embodiments take into account that there is a need to adaptively change the drilling speed used in drilling operations in a manner that selects an appropriate drilling speed for each layer in a stackup. The different advantageous embodiments detect the change in reaction thrust during a drilling operation. The reaction thrust is the force that may be detected when a drill bit is being drilled towards or into a layer.

This change in drilling thrust may be used in the different advantageous embodiments to determine whether a layer with a different type of material has been encountered. Based on this change, the different advantageous embodiments may adjust the drilling speed of the drilling operation. This change or delta in the reaction thrust force is used rather than the actual value of the thrust force.

The different advantageous embodiments provide an apparatus for performing drilling operations in a stackup. This apparatus may include a housing, a spindle, a spindle motor, a thrust motor, a thrust sensor, and a controller. The spindle may be capable of receiving a drilling bit, and the spindle motor may be capable of turning the spindle at a set of different speeds during a drilling operation. The thrust motor may be capable of moving the spindle in an axial direction. The thrust sensor may be capable of detecting reaction thrust force during the drilling operation to form a detected reaction thrust force. A controller may be capable of controlling the spindle motor and the thrust motor to change the drilling speed in response to changes in detected reaction thrust force.

Figure 3:
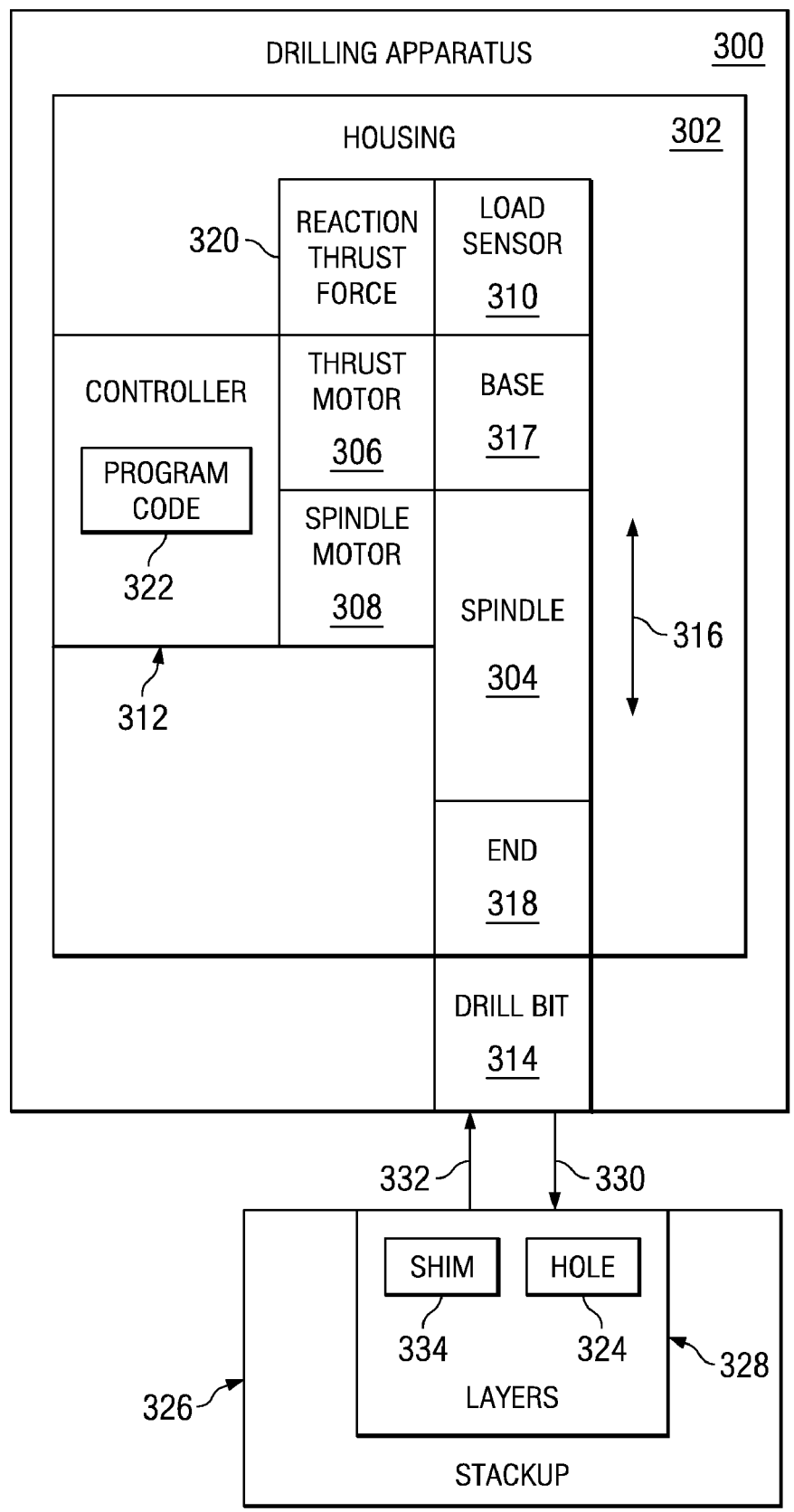
FIG. 3 is a block diagram of a drilling apparatus for performing drilling operations in accordance with an advantageous embodiment.

With reference now to FIG. 3, a block diagram of a drilling apparatus for performing drilling operations is depicted in accordance with an advantageous embodiment. In this example, drilling apparatus 300 may include housing 302, spindle 304, thrust motor 306, spindle motor 308, load sensor 310, controller 312, and drill bit 314.

Spindle 304 may rotate around an axis, such as axis 316. Further, spindle 304 may move axially along axis 316 in these examples. Spindle 304 may include base 317, which may be opposite to end 318. End 318 may receive drill bit 314 in these examples. Spindle 304 may be turned or rotated around axis 316 by spindle motor 308.

Spindle motor 308 may turn spindle 304 at different speeds. These speeds may be measured in revolutions per minute (RPM), in these examples. Spindle motor 308 may change the rate at which spindle 304 rotates during a drilling operation. Spindle motor 308 may take various forms. For example, spindle motor 308 may be, for example, without limitation, a servo motor, an air motor, or some other suitable motor.

Spindle 304 may be moved axially along axis 316 by thrust motor 306. The speed at which spindle 304 may be moved axially may be referred to as a feed rate. The feed rate may be measured in inches per revolution (IPR). Thrust motor 306 may change speeds during a drilling operation. In these examples, the speed of a drilling operation may include at lease one of the speed at which spindle 304 is rotated and the speed at which spindle 304 moves axially.

As used herein, the phrase "at least one of", when used with a list of items, means that different combinations of one or more of the items may be used and only one of each item in the list may be needed. For example, "at least one of item A, item B, and item C" may include, for example, without limitation, item A, or item A and item B. This example also may include item A, item B, and item C, or item B and item C.

In these illustrative examples, thrust motor 306 and spindle motor 308 may be controlled by controller 312. Controller 312 may take various forms. For example, controller 312 may be a computer embedded within housing 302, an application specific integrated circuit, or some other suitable device. Controller 312 may control the speed of spindle 304 using program code 322 and reaction thrust force 320, as detected by load sensor 310. In these examples, changes or differences in reaction thrust force 320 is used by controller 312 rather than the actual values for the reaction thrust force.

Load sensor 310 may be located at and/or around base 317 of spindle 304. Load sensor 310 may detect reaction thrust force 320, which may be used by controller 312 to control the drilling speed of spindle 304 using thrust motor 306 and spindle motor 308. Load sensor 310 may be any sensor that may detect force and generate an electronic signal based on the amount of force detected. Load sensor 310 may be, for example, without limitation, a strain gauge-type transducer.

Drilling apparatus 300 may be used to drill hole 324 in stackup 326. Stackup 326 may contain layers 328. These layers may be a set of layers. Layers 328 in stackup 326 may include a number of different materials in the layers. The materials may include, for example, without limitation, titanium, a composite material, aluminum, steel, or some other suitable material for stackup 326. Further, layers 328 may include a layer of air or a gap between layers, depending on the particular configuration of stackup 326.

In operation, drilling apparatus 300 may control the speed of spindle 304 in drilling hole 324. Controller 312 may execute program code 322 in drilling hole 324 through layers 328. A change between the layers may be detected by load sensor 310. This change is a change in reaction thrust force 320, which may be sent to controller 312. Upon detecting a change in reaction thrust force 320 indicating that a new layer has been encountered, controller 312 may change the speed of spindle 304. This speed may include at least one of the speed at which spindle 304 turns and the speed at which spindle 304 may be moved axially.

In moving spindle 304 axially, controller 312 may send signals to thrust motor 306 to move spindle 304 in either the direction of arrow 330 or in the direction of arrow 332. This movement, in these two different directions, may be referred to as peck and feed movement. In these examples, program code 322 may define or set the relational speed for a particular layer, as well as the feed rate for a particular layer within layers 328.

The different advantageous embodiments may not require adjustments as drill bit 314 wears. With currently used systems, as drill bit 314 wears, the mechanical sensor used to change the drilling speed may not correctly detect when a new layer has been reached. The different advantageous embodiments may not use the actual reaction thrust force detected to change the drilling speed for spindle 304.

Instead, the different advantageous embodiments detect changes in reaction thrust force that may indicate a new layer has been reached. For example, without limitation, if layers 328 include composite and titanium layers, a composite layer may cause a reaction thrust force of around 100 pounds, while a titanium layer may cause a reaction thrust force of around 150 pounds the first time these layers are reached. A later point in time, the titanium layer may have higher value for reaction thrust force 320 caused by wear and tear on drill bit 314.

The currently available drilling systems may require adjustments to form correct drilling. In contrast, the different advantageous embodiments detect a difference between reaction thrust force 320. For example, without limitation, a change in reaction thrust force 320 between a composite layer and a titanium layer may be around 100 pounds. This change or delta thrust may be consistent even though the actual value of reaction thrust force 320 changes through use of drill bit 314. These changes may include, for example, without limitation, wear in the interaction of spindle 304 and other components within drilling apparatus 300.

Thus, the different advantageous embodiments wait for reaction thrust force differences or deltas to know when different layers within layers 328 have been reached. As different layers are identified, program code 322 may control thrust motor 306 and spindle motor 308 to change the speed of spindle 304. Further, load sensor 310 may be used to identify when hole 324 has been drilled all the way through layers 328 in stackup 326.

Additionally, load sensor 310 may detect when an air layer has been reached within layers 328. An air layer may be encountered, for example, without limitation, when layers 328 in stackup 326 include shim 334, which may be unknown. At this point, this air layer may be ignored using program code 322 when such an air layer is detected. Detecting the changes in reaction thrust force 320, controller 312 also may be capable of detecting problems with drill bit 314. Controller 312 may determine whether drill bit 314 may have broken or whether drill bit 314 may have become dull.

The illustration of drilling apparatus 300 in FIG. 3 is presented for purposes of depicting different components that may be found in a drilling apparatus and not imply architectural or physical limitations to a manner in which drilling apparatus 300 may be implemented. For example, only some components used in drilling apparatus 300 are depicted for purposes of illustrating different features of the advantageous embodiments. Other components that may be included, but not shown, may be, for example, without limitation, a tool holder for receiving drill bit 314, a collet clamp to hold the drill bit in place, a switch to operate drilling apparatus 300, and other suitable components.

Further, although different functions are shown in blocks, the different functions may be integrated into a single component or a part and/or divided into multiple components or parts depending on the particular implementation. For example, controller 312 may be implemented using two controls. One control may be used to execute program code 322, while another controller may be used to write program code 322. In different advantageous embodiments, the second controller may be connected to the first controller and may not be located within housing 302.

Figure 4:
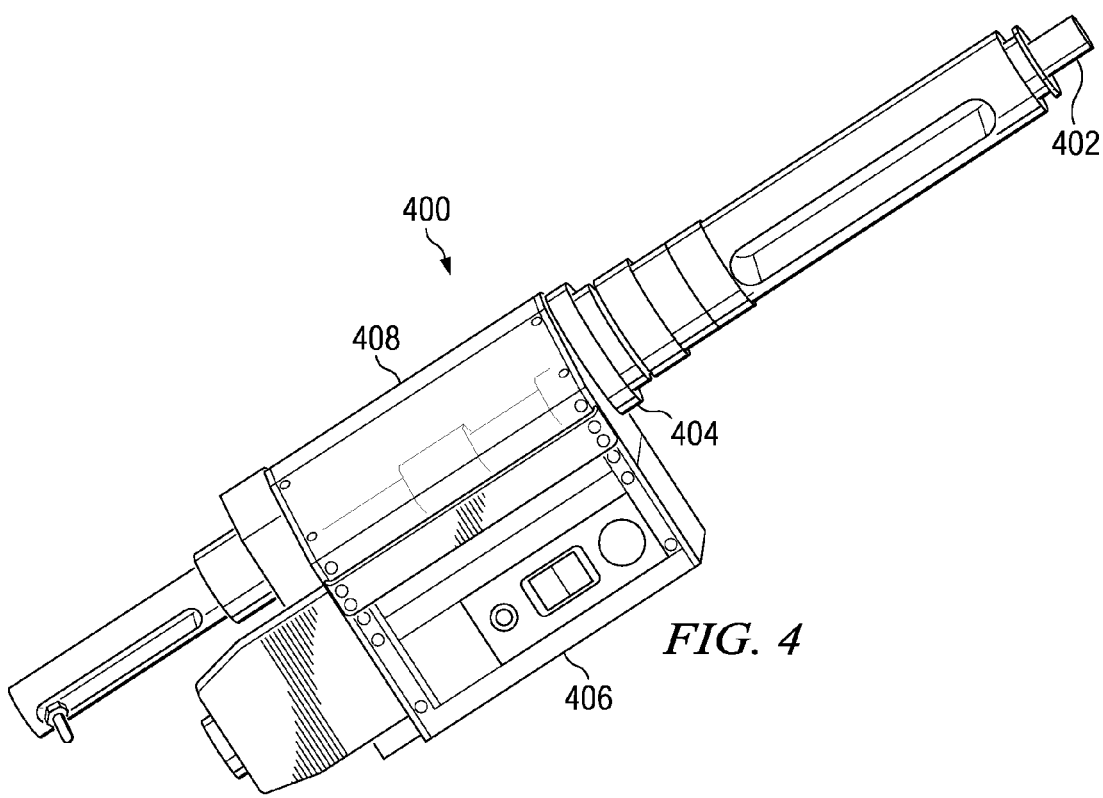
FIG. 4 is a diagram of a drill in accordance with an advantageous embodiment.

With reference now to FIG. 4, a diagram of a drill is depicted in accordance with an advantageous embodiment. In this example, a top view of drill 400 is depicted. Drill 400 may be an example of one implementation of drilling apparatus 300 in FIG. 3. As can be seen in this illustration, drill 400 may include drill spindle 402 within housing 404. Drill 400 may be capable of being configured for various functions such as, for example, without limitation, positive feed drilling, peck and feed drilling, and/or drilling and counter sink processes.

Drill 400 also may include thrust motor 406, and spindle motor 408. In these examples, these two motors may be externally mounted to housing 404. Of course, in other advantageous embodiments, one or more of these motors may be mounted within housing 404. In these examples, drill 400 may be implemented using any currently available drill that may be modified to include a load sensor such as load sensor 310 in FIG. 3. For example, without limitation, a Quackenbush 965QB drill may be used. This drill may be available from Cooper Industries, LLC. Of course, any suitable drill may be used.

Figure 5:
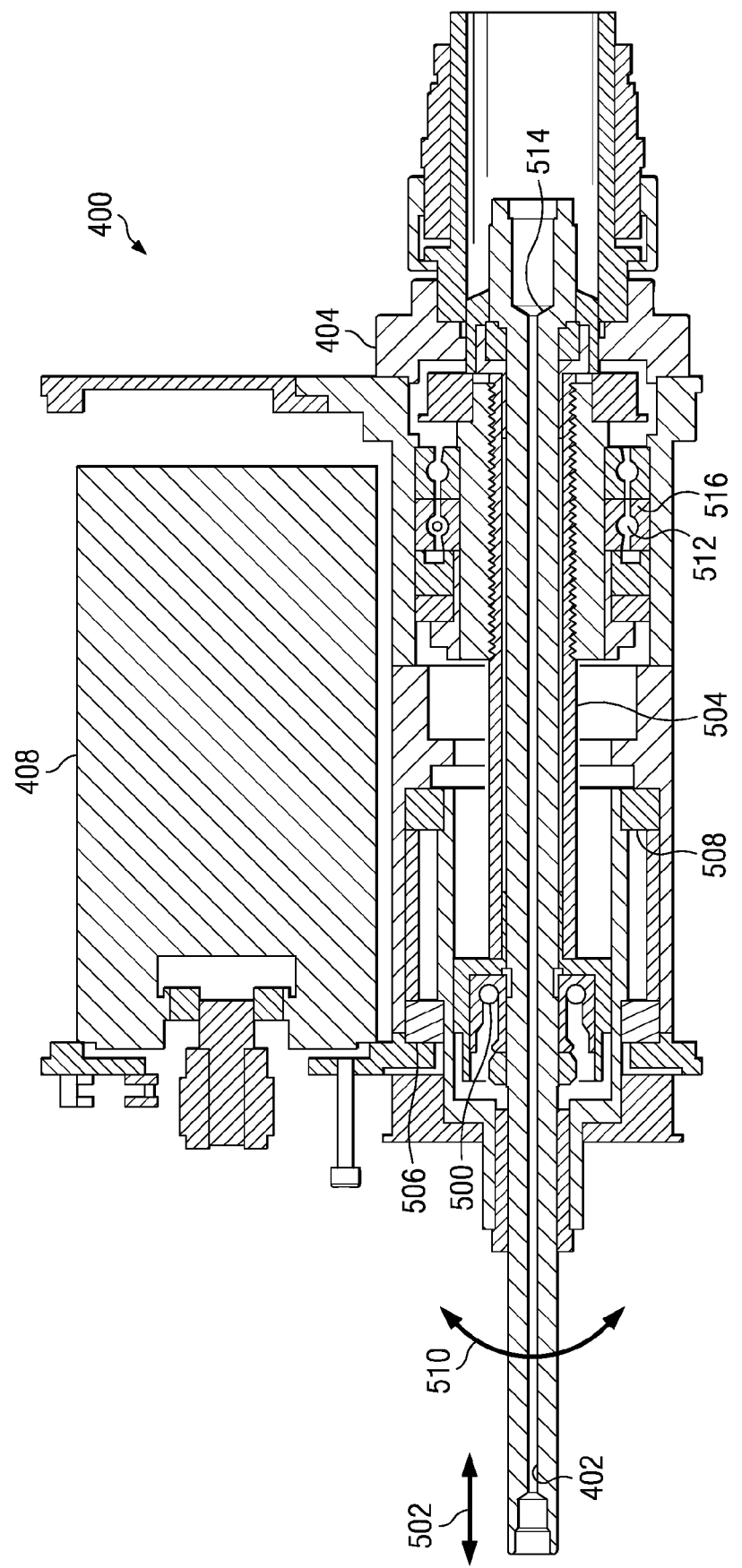
FIG. 5 is a diagram of a cross-sectional side view of a drill in accordance with an advantageous embodiment.

With reference now to FIG. 5, a diagram of a cross-sectional side view of a drill is depicted in accordance with an advantageous embodiment. In this example, a cross-sectional side view of drill 400 is illustrated. In this view, spindle thrust bearings 500 may be used to support spindle 402 in axial movements along the direction of arrows 502. Ball screw 504 may be actuated to move spindle 402 axially along the direction of arrows 502. Speed drive bearings 506 and 508 may be used to support spindle 402 when rotated in the direction of arrows 510.

In this example, load sensor 512 is located around base 514 of spindle 402. Load sensor 512 may be an electronic sensor used to detect reactive thrust force on spindle 402 when a drilling operation is performed. Load sensor 512 may be a sensor that converts axial force into an electric signal. In these examples, the axial force may be a compressive force, such as a reactive thrust force on spindle 402. Load sensor 512 may be placed to generate an electronic signal corresponding to the amount of axial force experienced by spindle 402. An example of a load sensor that may be used is, for example, without limitation, a model D through-hall compression load cell, which may be available from RDP Group.

The illustration in FIG. 5 is provided to show one location for a load sensor in accordance with an advantageous embodiment. Load sensor 512 may be located in a path of the reaction thrust force as shown in this illustration. A compressive force resulting from drill feed motion into a material by spindle 402 may be detected by load sensor 512. As spindle 402 encounters reactive thrust force, load sensor 512 also may experience the same force.

The location of load sensor 512 may vary depending on the particular drill used. One location that may be used for load sensor 512 may be within the thrust bearing assembly 516, which may be closely coupled to the reactive thrust force. This illustration is not meant to imply physical architectural limitations to the manner in which a load sensor may be located or implemented.

Figure 6:
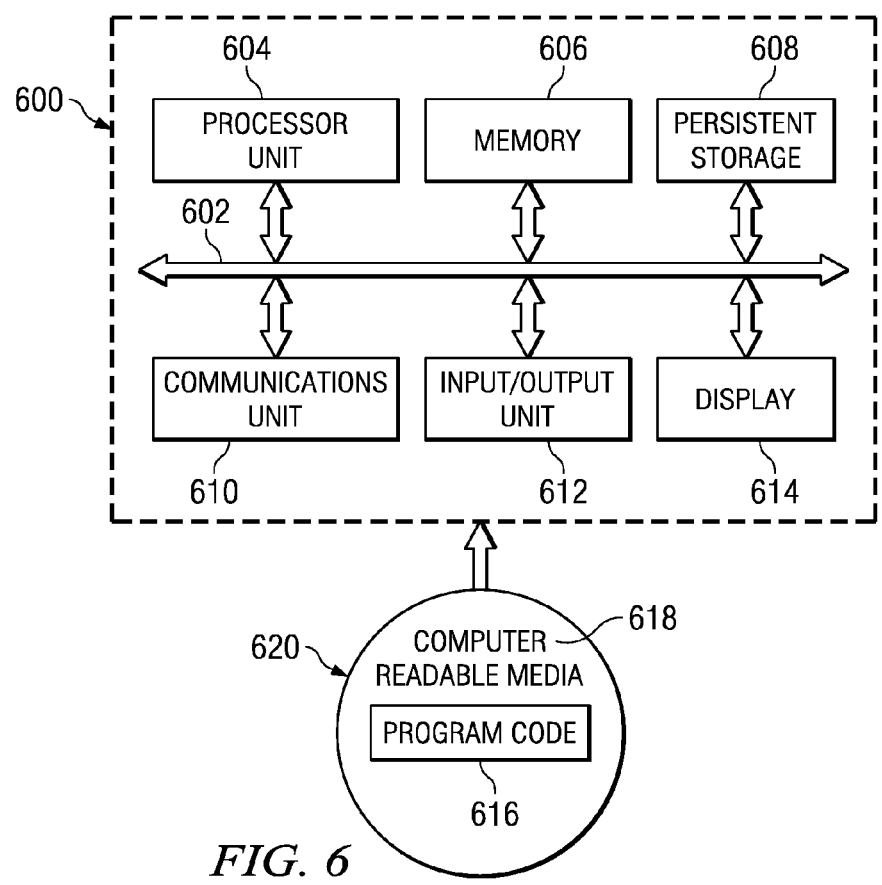
FIG. 6 is a diagram of a controller in accordance with an advantageous embodiment.

Turning now to FIG. 6, a diagram of a controller is depicted in accordance with an advantageous embodiment. In this example, controller 600 is an example of one implementation for controller 312 in FIG. 3. In this illustrative example, controller 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a set of one or more processors or may be a multi-processor core, depending on the particular implementation.

Memory 606 and persistent storage 608 are examples of storage devices. A storage device is any piece of hardware that is capable of storing information either on a temporary basis and/or a permanent basis. Memory 606, in these examples, may be, for example, a random access memory or any other suitable volatile or non-volatile storage device. Persistent storage 608 may take various forms depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output unit 612 allows for input and output of data with other devices that may be connected to controller 600. For example, input/output unit 612 may provide a connection for user input through a keyboard and mouse. Further, input/output unit 612 may send output to a printer. Display 614 provides a mechanism to display information to a user.

Instructions for the operating system and applications or programs are located on persistent storage 608. These instructions may be loaded into memory 606 for execution by processor unit 604. The processes of the different embodiments may be performed by processor unit 604 using computer implemented instructions, which may be located in a memory, such as memory 606. These instructions are referred to as program code, computer usable program code, or computer readable program code that may be read and executed by a processor in processor unit 604. The program code in the different embodiments may be embodied on different physical or tangible computer readable media, such as memory 606 or persistent storage 608.

Program code 616 is located in a functional form on computer readable media 618 that is selectively removable and may be loaded onto or transferred to controller 600 for execution by processor unit 604. In these examples, program code 616 is an example of program code 322 which may be used to control drilling apparatus 300 in FIG. 3.

Program code 616 and computer readable media 618 form computer program product 620 in these examples. In one example, computer readable media 618 may be in a tangible form, such as, for example, an optical or magnetic disc that is inserted or placed into a drive or other device that is part of persistent storage 608 for transfer onto a storage device, such as a hard drive that is part of persistent storage 608.

In a tangible form, computer readable media 618 also may take the form of a persistent storage, such as a hard drive, a thumb drive, or a flash memory that is connected to controller 600. The tangible form of computer readable media 618 is also referred to as computer recordable storage media. In some instances, computer readable media 618 may not be removable.

Alternatively, program code 616 may be transferred to controller 600 from computer readable media 618 through a communications link to communications unit 610 and/or through a connection to input/output unit 612. The communications link and/or the connection may be physical or wireless in the illustrative examples. The computer readable media also may take the form of non-tangible media, such as communications links or wireless transmissions containing the program code.

The different components illustrated for controller 600 are not meant to provide architectural limitations to the manner in which different embodiments may be implemented. The different illustrative embodiments may be implemented in a data processing system including components in addition to or in place of those illustrated for controller 600. Other components shown in FIG. 6 can be varied from the illustrative examples shown.

Figure 7:
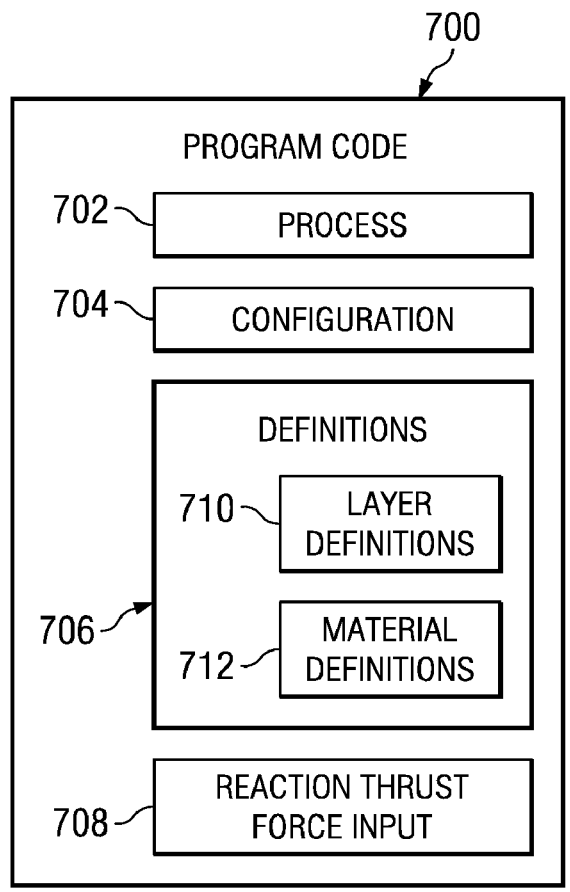
FIG. 7 is a block diagram of program code for controlling a drilling apparatus in accordance with an advantageous embodiment.

With reference now to FIG. 7, a block diagram of program code for controlling a drilling apparatus is depicted in accordance with an advantageous embodiment. In this illustrative example, program code 700 is an example of one implementation of program code 322 in FIG. 3. In particular, program code 700 may be executed using a controller, such as controller 600 in FIG. 6.

As illustrated, program 700 includes process 702, configuration 704, and definitions 706. Process 702 contains code to perform drilling operations in an adaptive manner. Configuration 704 provides initialization values for process 702. Process 702 may use configuration 704 in definitions 706 and reaction thrust force input 708 to dynamically and/or adaptively control a drilling operation for a drilling apparatus, such as drilling apparatus 300 in FIG. 3. Reaction thrust force input 708 may be a value generated by a load sensor, such as, for example, without limitation, load sensor 310 in FIG. 3. This value is a value for reaction thrust force 320 in FIG. 3.

Definitions 706 define layers within a stackup, such as, for example, without limitation, stackup 326 in FIG. 3. In this example, definitions 706 include layer definitions 710, and material definitions 712. Layer definitions 710 may provide definitions for the different layers. Layer definition 710 may include, for example, without limitation, an identification of a layer, a thickness, and/or other suitable parameters. Material definitions 712 may provide information, for example, without limitation, to identify layer transitions, and/or drilling speeds.

Figure 8:
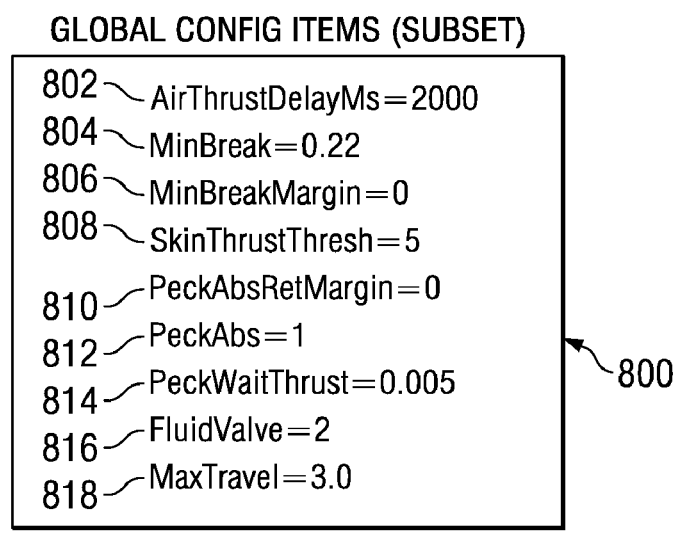
FIG. 8 is a diagram of configuration items in accordance with an advantageous embodiment.

With reference now to FIG. 8, a diagram of configuration items is depicted in accordance with an advantageous embodiment. In this example, configuration 800 is an example of one implementation for configuration 704 in FIG. 7. In this example, configuration 800 provides initialization values for performing a drilling process.

In this particular example, configuration 800 includes air thrust delay 802, minimum break 804, minimum break margin 806, skin thrust threshold 808, peck absolute retention margin 810, peck absolute value 812, peck wait thrust 814, fluid valve value 816, and maximum travel 818.

Air thrust delay 802 may be a delay of the process during which information about thrust readings before material contact is gathered. This delay may compensate for any frictional losses in the system which would otherwise show up as additions to the thrust value. Minimum break 804 may be the distance the feed mechanism may travel after detecting a thrust difference while maintaining current drilling parameters. This value may allow the full diameter of the drill bit to penetrate the new material prior to changing parameters.

Minimum break margin 806 may be a distance added to minimum break 804. This value may allow the operator to effectively increase the minimum break distance without changing the minimum break 804. For example, a base value for minimum break 804 may be often times associated with a cutter geometry. Under certain circumstances, increasing or decreasing this value temporarily may be useful, based on the current stack being drilled. Adjusting minimum break margin 806 may allow for such a temporary adjustment, without affecting the minimum break 804.

Skin thrust threshold 808 may be the value of thrust above which the controller decides initial material contact has been attained after the initial drill advance through air.

Peck absolute retract margin 810 may allow the drill to return to the same absolute position during a peck and retract cycle when in a peck absolute mode. This value may allow adjustment of the absolute position in a negative or positive direction. Peck absolute value 812 may be a Boolean value (yes/no). If the value is "yes", then the drill may return to the same absolute position during a peck retract motion. If the value is "no", then the drill may retract a relative distance determined by a peck retract distance, during a peck retract motion.

Peck wait thrust 814 may be a distance a drill must travel after completing a full peck motion and moving forward into the material before reading reactive thrust forces. This parameter may provide a safety margin to insure that reactive thrust force values may not be read while the drill may be disengaged from the material.

Fluid valve value 816 may provide a value to control an auxiliary fluid pump, which delivers cutting fluid to the drill. Maximum travel 818 may be the maximum distance that the spindle can translate before changing to retract mode.

The different initialization values illustrated in FIG. 8 are provided as examples and not meant to limit the manner in which other configuration items may be selected. Other configuration items in addition to or in place of these may be used depending on the particular implementation.

With reference now to FIG. 9, a diagram of layer definitions is depicted in accordance with an advantageous embodiment. In this example, layer definitions 900 are an example of one implementation of layer definitions 710 in FIG. 7.

In this example, layer definitions 900 include titanium 902 and graphite 904. Titanium 902 includes material name 906, layer number 908, thickness 912, delta thrust 914, peck enabled 916, peck increment 918, peck extend margin 920, peck dwell 922, and peck retract 924. Graphite 904 includes material name 926, layer number 928, thickness 930, delta thrust 932, peck enabled 934, peck increment 936, peck extend margins 938, peck dwell 940, and peck retract 942.

Material names 906 and 926 may be used to identify the material. Layer numbers 908 and 928 may identify the position of the particular definition within the stackup. Thicknesses 912 and 930 may identify the thickness of the particular layer. Delta thrusts 914 and 932 may be used to identify a type of process for use in drilling for a given layer.

In these examples, two types of processes may be used. The processes include, for example, without limitation, a computer numeric control process and an adaptive thrust process. The computer numeric control process may be one in which the speed of the drill may be controlled based on the distance that the drill bit may have traveled. This distance may be identified based on encoders which identify the number of revolutions. Based on the number of revolutions, a distance may be identified for how far the drill bit has traveled. The adaptive thrust process may be one in which the speed of the drill may be controlled based on an identification of which layer is being drilled.

In these examples, delta thrust 932 has a value of zero. This value identifies graphite 904 as a computer numerically controlled layer. With this type of layer, the drill moves through the material for a distance equal to thickness 930. After that distance has been traveled, the next layer may be used for setting the speed of the drill. In other words, with delta thrust having a value of zero, the drilling operation does not change speed based on the reactive thrust force. Instead, the distance travel is used to determine when a layer has been reached.

In titanium 902, delta thrust 914 has a value of 80. With this value, the process may wait for the reactive thrust readings to change by a set amount which may be less than or greater than delta thrust 914 depending on the implementation. Once the change in thrust has been detected, a new layer has been identified and the drilling speed may be changed.

Peck enabled 916 and 934 may determine whether a pecking feed process is to be used with the particular layer. Peck increments 918 and 936 identify the additional distance the drill bit travels for each peck. Peck well may represent a time for feed rate pause at the bottom of the hole prior to a peck retract. This time may help resolve any chips and depth irregularities. Peck extend margin represents a distance that may allow the drill bit to extend until just reaching the material to be drilled. Peck retract 924 and 942 identify the distance that the spindle retracts during the peck and feed process.

With reference now to FIG. 10, a diagram illustrating material definitions is depicted in accordance with an advantageous embodiment. In this example, material definitions 1000 are an example of one implementation of material definitions 712 in FIG. 7. In this example, material definitions 1000 include graphite 1002, aluminum 1004, and titanium 1006.

Graphite 1002 includes material name 1008, normalize hardness 1010, inches per revolution 1012, and revolutions per minute 1014. Aluminum 1004 includes material name 1016, normalize hardness 1018, inches per revolution 1020, and revolutions per minute 1022. Titanium 1006 includes material name 1024, normalize hardness 1026, inches per revolution 1028, and revolutions per minute 1030.

Material names 1008, 1016, and 1024 may be used as an index for the material names identified in layer definitions 900 in FIG. 9. Normalize hardness 1010, 1018, and 1026 may be used to identify whether a layer to layer transition is a soft-to-hard transition or a hard-to-soft transition. For example, without limitation, if one layer has a normalized hardness of 0.2 and the next layer has a normalized hardness of 0.8, this type of transition is a soft-to-hard transition. For example, without limitation, moving from graphite 1002 to titanium 1006 may be an example of a soft-to-hard transition in layers.

Figure 11:
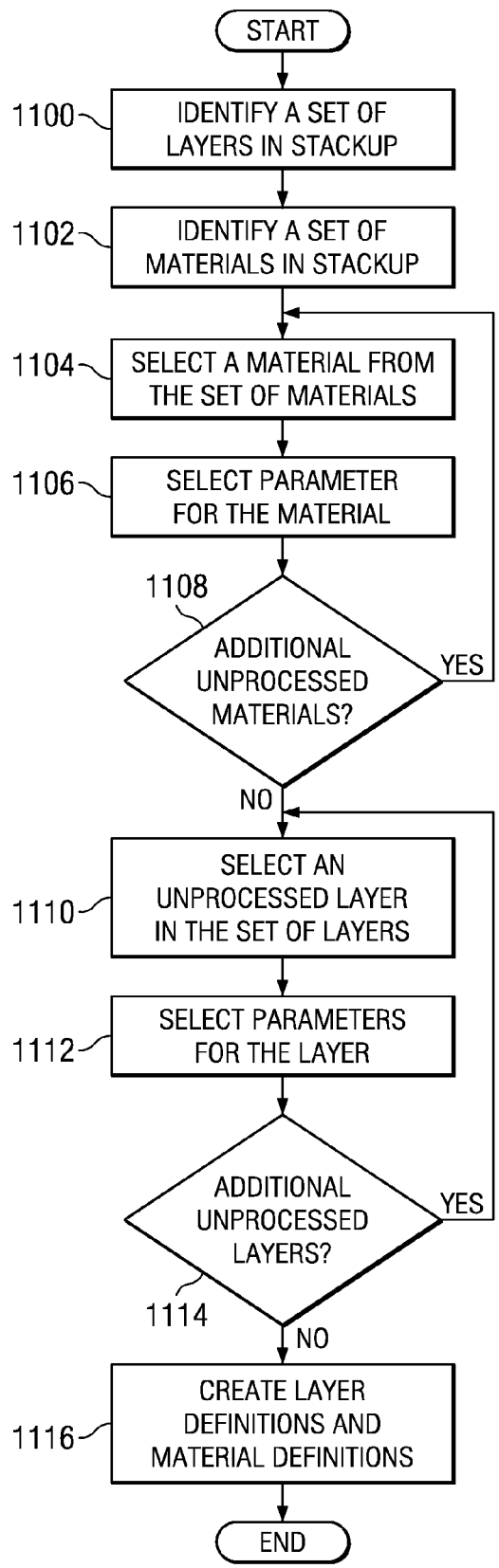
FIG. 11 is a flowchart of a process for creating a drilling program in accordance with an advantageous embodiment.

With reference now to FIG. 11, a flowchart of a process for creating a drilling program is depicted in accordance with an advantageous embodiment. The process illustrated in FIG. 11 may be used to create program code, such as, for example, without limitation, program code 700 in FIG. 7. In particular, this process may be used to generate portions of program code 700, such as, for example, definitions 706 in FIG. 7.

The process may begin by identifying a set of layers in the stackup (operation 1100). A set, as used herein, refers to one or more items. For example, without limitation, a set of layers is one or more layers. In this example, each layer may be comprised of a single material or type of material. The process may identify a set of materials for the stackup (operation 1102). These layers may include, for example, without limitation, aluminum, titanium, composite material, fabric, wood, air, metal alloy, or some other suitable material.

The process may select a material from the set of materials (operation 1104). Thereafter, the process may select parameters for the material (operation 1106). In selecting parameters for the material, parameters, such as, for example, axial movement, revolutions per minute, and nominal hardness, may be selected. Of course, other parameters also may be selected depending on the particular implementation. The process then determines whether additional unprocessed materials are present (operation 1108). If additional unprocessed materials are present, the process returns to operation 1104.

Otherwise, the process selects an unprocessed layer in the set of layers (operation 1110). The process selects parameters for the selected layer (operation 1112). These parameters may include various values for material and layer definitions. In operation 1112, parameters such as, for example, without limitation, delta thrust, pecking feed options, layer number, layer thicknesses, and other suitable parameters may be set in this operation.

The process may then determine whether additional unprocessed layers are present (operation 1114). If additional unprocessed layers are present, the process returns to operation 1110. Otherwise, the process may create layer definitions and material definitions from the selected parameters (operation 1116), with the process terminating thereafter.

Figure 12:
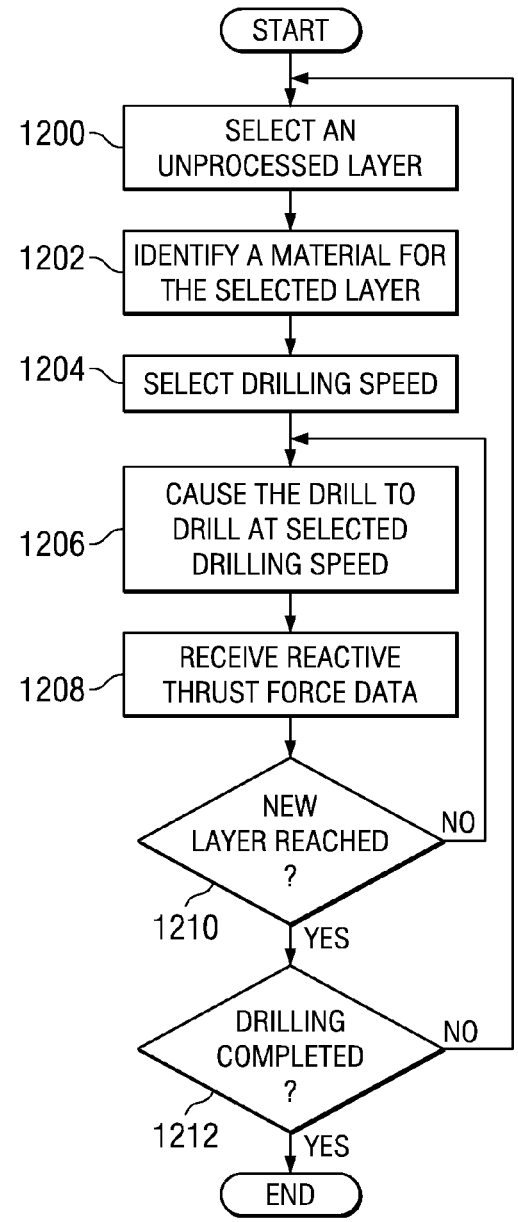
FIG. 12 is a flowchart of a process for performing a drilling operation in accordance with an advantageous embodiment.

With reference now to FIG. 12, a flowchart of a process for performing a drilling operation is depicted in accordance with an advantageous embodiment.

The process may begin by selecting an unprocessed layer (operation 1200). In this example, the unprocessed layer may be selected from a definition such as, for example, without limitation, layer definitions 710 within program code 700 in FIG. 7. The process may identify a material for the selected layer (operation 1202). This identification may be made by identifying the material in the layer definition. From the identified material, details about the drilling may be obtained from another definition such as, for example, without limitation, material definitions 712 in FIG. 7.

The process may select a drilling speed (operation 1204). This operation may select a drilling speed based on the identified material in the selective layer. The process may then cause the drill to drill at the selected drilling speed (operation 1206).

As described above, this selected speed may include the rate at which the spindle turns, as well as the speed at which the spindle moves axially. This movement may be towards the stackup if the speed for the spindle is positive axially. If the speed for the spindle is selected as being negative, the spindle may move away from the stackup. A zero spindle speed means that the spindle is held steady and does not retract or move forward.

The process may receive reactive thrust force data (operation 1208). This reactive thrust force data may be received from a sensor such as, for example, without limitation, load sensor 310 in FIG. 3. A determination may be made as to whether a new layer has been reached (operation 1210). The determination in operation 1210 may be made by identifying changes in the reactive thrust force data identified in operation 1208. If the change meets some threshold level, then a transition from one layer to another layer may be identified. If a new layer is not reached, the process may return to operation 1206.

If a new layer is reached, a determination may be made as to whether the drilling has been completed (operation 1212). In operation 1212, the drilling may be complete if all the layers have been processed. Drilling also may be considered complete even if all the layers have not been processed, if the spindle has been extended to its maximum extent and cannot be extended any farther into the stackup. If drilling is not complete, the process may return to operation 1200 to select another layer for processing. Otherwise, the process terminates.

Figure 13A:
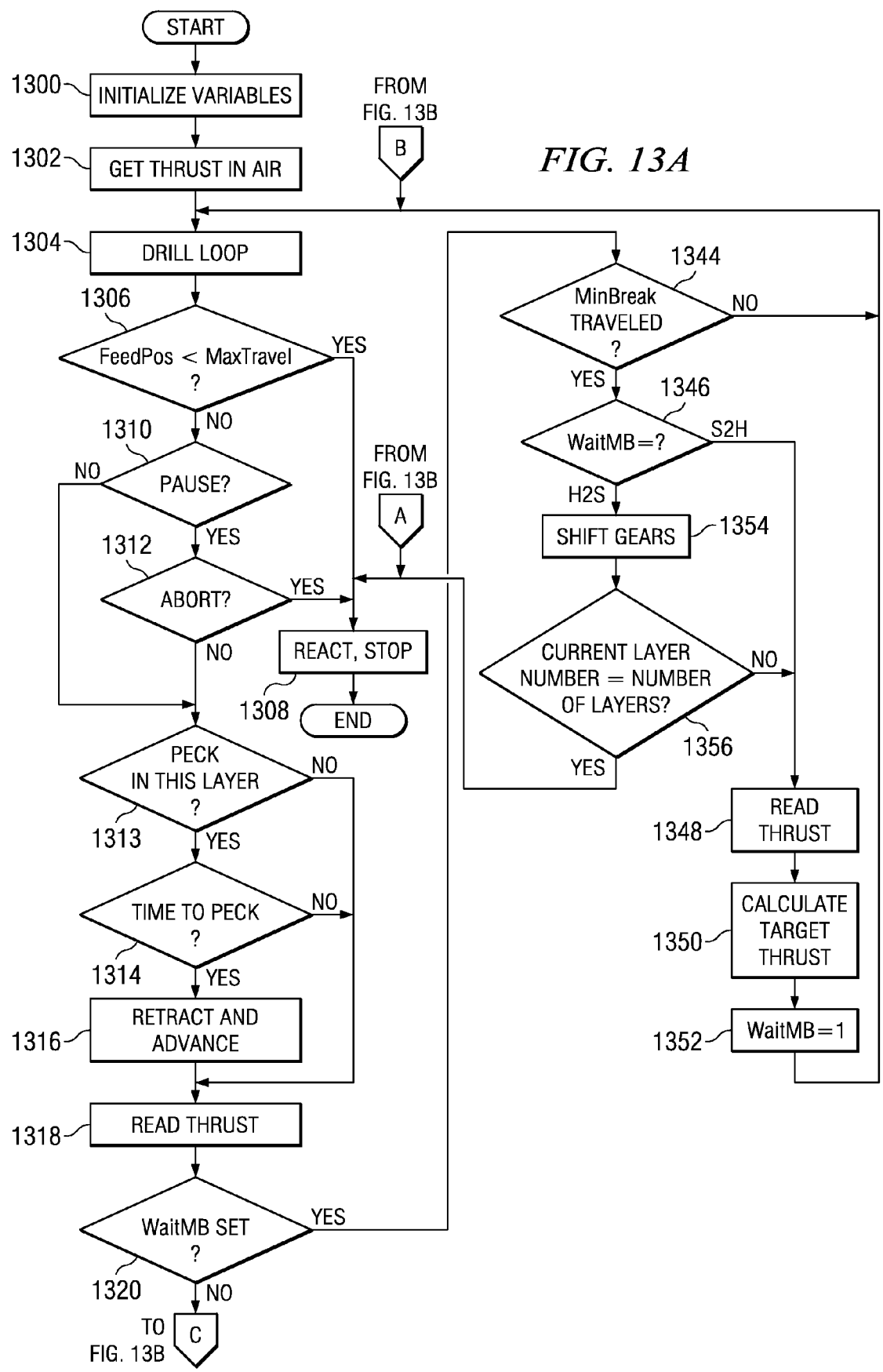
FIGS. 13A and 13B are a flowchart of a process for performing a drilling operation in accordance with an advantageous embodiment.
Figure 13B:
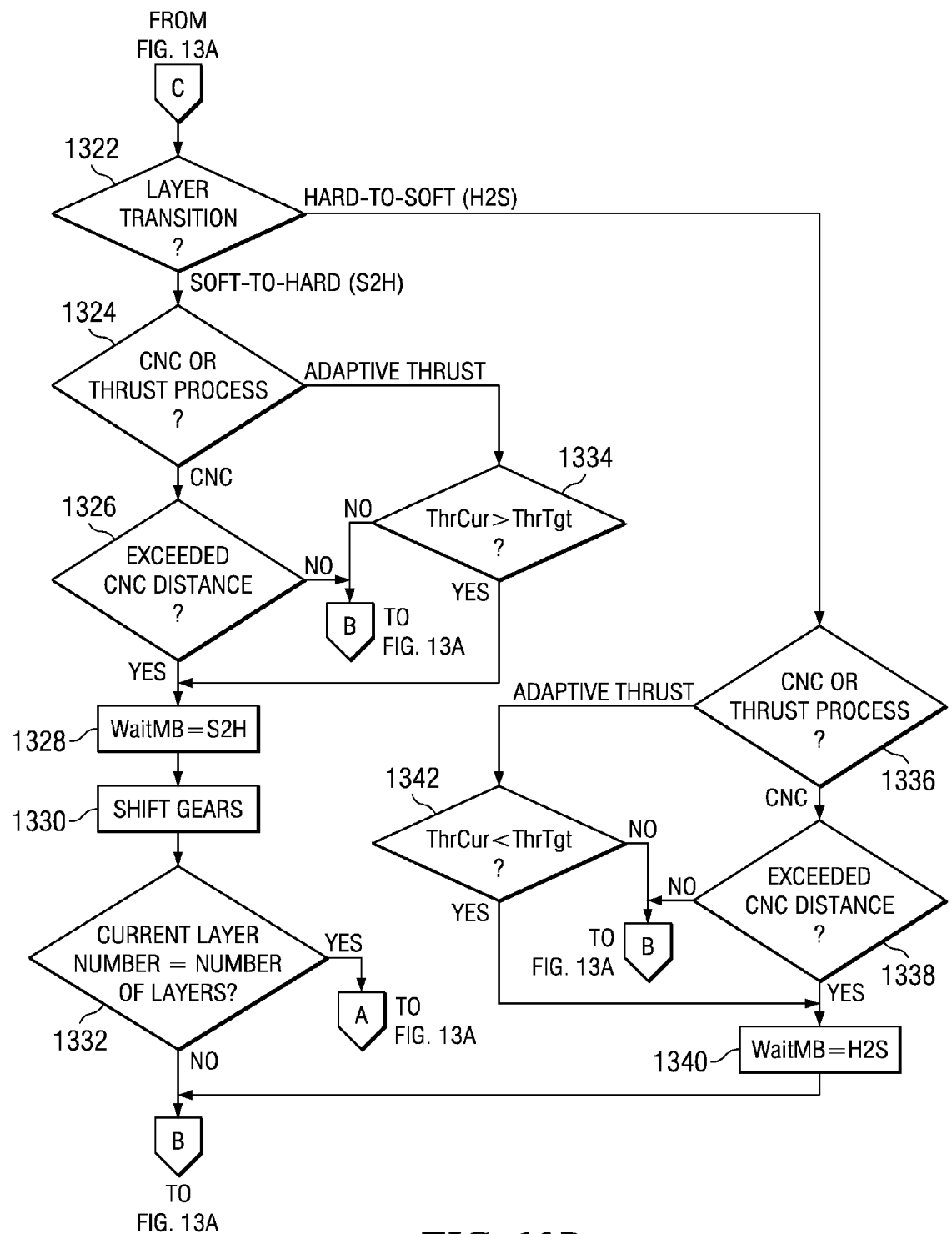

With reference now to FIGS. 13A and 13B, a flowchart of a process for performing a drilling operation is depicted in accordance with an advantageous embodiment. FIGS. 13A and 13B are a detailed example of one implementation of process 702 in FIG. 7.

The process may begin by initializing variables (operation 1300). These variables may be initialized using configuration items such as, for example, without limitation, those illustrated in configuration 800 in FIG. 8. The process may obtain the reactive thrust force in air (operation 1302).

The thrust sensor reading may be taken while the drill bit is known to be in air in order to calibrate a no-thrust state. Frictional variations in the drive mechanism may cause slight readings in the load sensor for which compensations may be made. The process may enter drill loop (operation 1304). Within drill loop 1304, a determination may be made as to whether the current position of the feed axis motor, FeedPos, as read from the position of the encoder is less than the maximum distance the feed axis can physically travel, MaxTravel, (operation 1306).

If the current position of the feed axis motor is less than the maximum distance, the process retracts the drill bit and stops the spindle (operation 1308), with the process terminating thereafter.

If the current position of the feed axis motor has not traveled the maximum distance, a determination may be made as to whether a pause should occur in the drilling operation (operation 1310). If a pause has occurred, a determination may be made as to whether to abort the drilling operation (operation 1312). In these examples, the pause may be determined by operator control. An Abort also may be determined by operator control. If the drilling operation is to be aborted, the process proceeds to operation 1308 as described above.

If the drilling operation is not to be aborted in operation 1312 or the drilling operation has not paused in operation 1310, a determination may be made as to whether a peck is to be performed in the current layer (operation 1313). This determination may be made by determining whether a peck is enabled in the layer definition for the particular layer.

If a peck is to be performed in the layer, a determination may be made as to whether it is time to perform a peck (operation 1314). The "time to peck" may be determined based on feed position as read from positional encoders and comparing this position to the peck increment parameter. If the feed position has exceeded peck increment, then a peck cycle may be initiated. If it is time to perform a peck, the process may retract the spindle and advance the spindle (operation 1316). The retraction and advancement of the spindle is performed based on parameters set in the layer definitions in these examples.

The process may read a reactive thrust force (operation 1318). In operation 1318, this reactive thrust force is read or obtained from a load sensor such as, for example, without limitation, load sensor 310 in FIG. 3. The process also may proceed directly to operation 1318 from operation 1314 if the determination is made that it is not time to perform a peck operation.

The process then determines whether the value for wait for minimum break, WaitMB, may be set to a value (operation 1320). This value may be initialized as a −1 in these examples. In these examples, the variable WaitMB may be set equal to S2H or H2S depending on the particular type of transition. S2H may represent a soft-to-hard transition in layers, which H2S may represent a hard-to-soft transition in layers. This variable may be used in operation 1320 to determine whether the process is waiting for the drill to travel a relative distance equal to minimum break. If the variable WaitMB is not set equal, the process may identify the type of layer transition that has occurred (operation 1322).

If the layer transition is a soft-to-hard transition, a determination may be made as to whether a computer numerical control (CNC) process for an adaptive thrust process is to be used (operation 1324). The identification of this type of process may be made from the layer definitions. If a computer numerical control process is to be performed, a determination may be made as to whether the spindle has exceeded the distance set for this process (operation 1326). If the spindle has not exceeded this distance, the process may return to drill loop 1304 to continue drilling.

Otherwise, the process sets the variable WaitMB equal to S2H (operation 1328). This variable may indicate why the process is waiting for a distance for minimum break to pass. The value S2H represents a soft-to-hard transition.

The process then shifts gears (operation 1330). In shifting gears in operation 1330, a new layer in the layer definitions is selected for processing. A determination may be made as to whether the current layer number is greater than the number of layers present in the layer definitions (operation 1332). If the current layer number is greater or equal to the number of layers, the drilling process may be complete and the process proceeds to operation 1308 as described above. If the current layer number is not greater than the number of layers, then another layer may be present for drilling, and the process returns to drill loop 1304.

With reference again to operation 1324, if the process is an adaptive thrust process, a determination may be made as to whether the reactive thrust change, ThrCur, is greater than the threshold set, ThrTgt, for the change (operation 1334). If the change in the reactive thrust is greater than the threshold, the process proceeds to operation 1328 as described above. This determination indicates that a new layer may have been reached. If the reactive thrust is not greater than the threshold level, the process may continue the drilling operation and returns to drill loop 1304 as described above.

With reference again to operation 1322, if the layer transition is a hard-to-soft transition, a determination may be made as to whether the process is a computer numerical control (CNC) process or an adaptive thrust process (operation 1336). If the process is a computer numerical control process, a determination may be made as to whether the spindle has exceeded the distance set for this layer (operation 1338).

If the spindle has not exceeded the distance, the process may return to drill loop 1304. Otherwise, the process may set the variable WaitMB equal to H2S (operation 1340). The process may then return to drill loop 1304.

With reference again to operation 1336, if an adaptive thrust process is being used, a determination may be made as to whether the change in the reactive thrust force, ThrCur, is greater than the threshold level, ThrTgt, (operation 1342). If the change in thrust is greater than the threshold level, the process may proceed to operation 1340 as described above. Otherwise, the process may return to drill loop 1304.

With reference again to operation 1320, if the variable WaitMB has been set, the process may determine whether the minimum break distance, MinBreak, has been traveled (operation 1344). Minimum break may be the distance the feed mechanism is required to travel after a difference in reactive thrust force is detected while maintaining current drilling parameters. This operation may allow the full diameter of the drill bit to penetrate the new material prior to changing parameters.

If the minimum break distance has not been traveled, the process may return to drill loop 1304 to continue performing the drilling operation. Otherwise, a determination may be made to identify the value of WaitMB (operation 1346).

If waitMB is set equal to S2H, the process may read the reactive thrust (operation 1348). The process may then calculate the target thrust (operation 1350). In operation 1350, the target thrust may be calculated as the current thrust plus the delta thrust if the variable WaitMB is equal to S2H. If the variable WaitMB is equal to H2S, the target thrust may be calculated as the current thrust minus the delta thrust. The process may set the variable WaitMB equal to a negative 1 (operation 1352), with the process returning to drill loop 1304. A negative 1 may indicate that wait per minimum break is not set.

With reference again to operation 1346, if the variable WaitMB is set equal to H2S, the process may shift gears (operation 1354). As described before, a shifting of gears may involve reading the new layer in material definitions in setting a speed for the drilling operation. When gears are changed, the current layer number is incremented because a new layer is being processed in the set of layers.

A determination may be made as to whether the current layer number is greater than or equal to the number of layers in the stack (operation 1356). In operation 1356, if the current layer is greater than the number of layers, drilling of the last layer may have completed. If the current layer is equal to the number of layers in a stack, the current layer may be last the layer to be drilled. If the current layer number is not greater than the number of layers, the process may proceed to operation 1348 as described above. Otherwise, the process may proceed to operation 1308.

Figure 14:
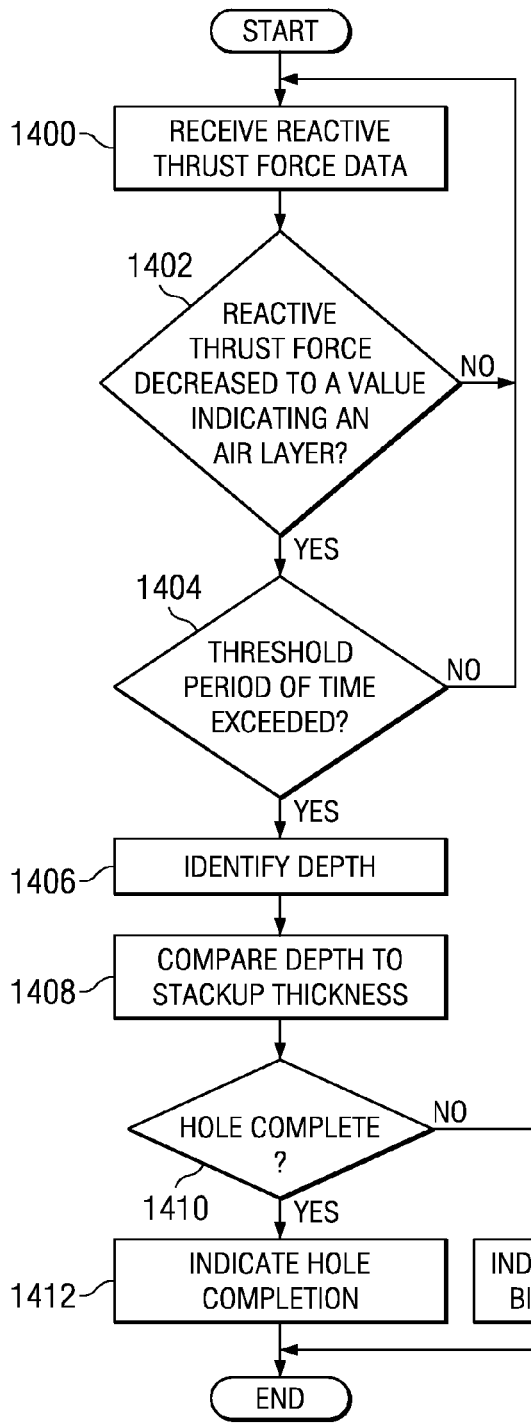
FIG. 14 is a flowchart of a process for detecting whether a drill bit has been damaged in accordance with an advantageous embodiment.

With reference now to FIG. 14, a flowchart of a process for detecting whether a drill bit has been damaged is depicted in accordance with an advantageous embodiment. The process illustrated in FIG. 14 may be implemented in process 702 in FIG. 7.

The process begins by receiving reactive press force data (operation 1400). A determination may be made as to whether the reactive thrust force has decreased to a value indicating a presence of an air layer (operation 1408). If the reactive thrust force indicates that an air layer has not been reached, the processor may return to operation 1400. If the reactive thrust force indicates a presence of an air layer, a determination may be made as to whether a threshold period of time has been exceeding operation 1404. If a threshold period of time has not been exceeded, the process also may return to operation 1400.

If a threshold period of time has been exceeded in which an air layer is identified as being present, a depth of the drill bit may be identified (operation 1406). This depth may be compared to a thickness of the stackup being drilled (operation 1408). A determination may be made as to whether the hole may have been completed (operation 1410). If the depth is greater than the stackup thickness, a determination may be made in operation 1410 that the hole has been completed.

If the hole has been completed, the process then may indicate a completion of the hole (operation 1412) with the process terminating thereafter. Otherwise, the process may indicate that drill bit damage may be present (operation 1414) with the process terminating thereafter.

Figure 15:
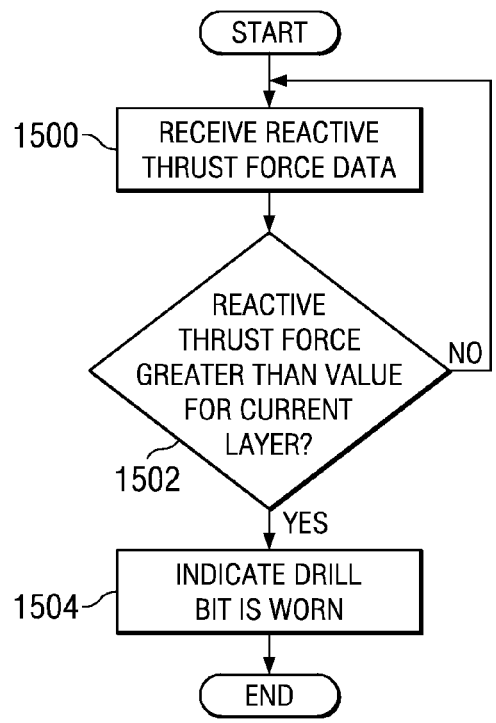
FIG. 15 a flowchart of a process for identifying whether a drill bit is worn or unusable in accordance with an advantageous embodiment.

With reference now to FIG. 15, a flowchart of a process for identifying whether a drill bit is worn or unusable is depicted in accordance with an advantageous embodiment. The process in FIG. 15 may be implemented in process 702 in FIG. 7.

The process begins by receiving reactive thrust force data (operation 1500). A determination may be made as to whether the reactive thrust force is greater than a value for the current layer. This value may be a value of the expected reactive thrust force for the current layer. If the reactive thrust force is not greater than the value for the current layer, the process may return to operation 1500. Otherwise, the process may indicate that the drill bit may be worn (operation 1504) with the process terminating thereafter.

In this manner, the different advantageous embodiments provide a method and apparatus for performing drilling operations. In the different advantageous embodiments, transitions between different layers are identified using reactive force thrust measurements. The monitoring of reactive force thrust is made to identify changes or differences in reactive force thrust.

The differences may be used to identify when another layer having a different type of material has been reached. This type of measurement is made in contrast to measuring the actual value of the thrust to identify a type of material. With this type of measurement, changes due to mechanical wear and tear in the drilling apparatus may not affect the identification of transitions from one layer to another layer. As a result, adjustments to the drilling apparatus and/or program for the drilling apparatus may not be needed.

Further, with these measurements, failures or problems with a drill bit may be identified in addition to identifying transitions. The identification of the transition from one layer to another layer may be used to change the drilling speed for a particular type of material. In this manner, time needed to drill through a stackup may be reduced because faster drilling speeds may be used for softer materials rather than using a slowest speed for the hardest material present in a stackup.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for performing a drilling operation on a particular stackup, the apparatus comprising:
   a housing;
   a spindle capable of receiving a drill bit;
   a spindle motor capable of turning the spindle at a set of different speeds during the drilling operation;
   a thrust motor capable of moving the spindle in an axial direction;

a load sensor capable of detecting a reaction thrust force during the drilling operation to form a detected reaction thrust force; and a controller capable of controlling the spindle motor and the thrust motor to change a drilling speed in response to instructions stored in one or more computer readable storage devices and executed by one or more processors based on the detected reaction thrust force, layer definitions, and material definitions stored in the one or more computer readable storage devices, wherein the layer definitions and the material definitions are for the particular stackup, and wherein the definitions include a peck wait thrust value that specifies a distance the drill bit must travel after completing a full peck motion and moving forward in a material before reading reactive thrust force values from the load sensor.

2. The apparatus of claim 1 further comprising:
program code executable by the controller to change the drilling speed during the drilling operation.

3. The apparatus of claim 2, wherein the program code comprises a process, layer definitions, and material definitions.

4. The apparatus of claim 3, wherein the layer definitions define a set of layers in a stackup for the drilling operation.

5. The apparatus of claim 4, wherein the layer definitions define a change in the reactive thrust force indicating when a new layer is reached in the set of layers.

6. The apparatus of claim 4, wherein the layer definitions define a thickness of a layer.

7. The apparatus of claim 6, wherein the thickness is used to identify a distance to perform the drilling operation when a change in the detected reaction thrust force is not used to control the drilling speed.

8. The apparatus of claim 4, wherein the material definitions define the drilling speed for a material in the material definitions.

9. The apparatus of claim 5, wherein the material definitions further define a normalized hardness used to identify a layer transition within the set of layers.

10. The apparatus of claim 1, wherein the drilling speed comprises at least one of a speed at which the spindle turns and a speed at which the thrust motor moves the spindle in the axial direction.

11. The apparatus of claim 1, wherein the spindle has a base and wherein the thrust motor has a positive drilling speed when the thrust motor moves the spindle away from the base, a neutral drilling speed when the thrust motor does not move the spindle, and a negative drilling speed when the thrust motor moves the spindle towards the base.

12. An apparatus for performing a drilling operation on a stackup of materials for an aircraft, the apparatus comprising:
a housing;
a spindle capable of receiving a drill bit, wherein the spindle has a base;
a spindle motor capable of turning the spindle at a set of different speeds during a drilling operation, wherein a drilling speed comprises at least one of a speed at which the spindle turns and a speed at which a thrust motor moves the spindle in an axial direction;
the thrust motor capable of moving the spindle in the axial direction, wherein the thrust motor has a positive drilling speed when the thrust motor moves the spindle axially away from the base, a neutral drilling speed when the thrust motor does not move the spindle, and a negative drilling speed when the thrust motor moves the spindle axially towards the base;

a load sensor capable of detecting a reaction thrust force during the drilling operation to form a detected reaction thrust force, wherein the load sensor is located around the base;

a controller capable of controlling the spindle motor and the thrust motor to change the drilling speed in response to changes in the detected reaction thrust force; and program code executable by the controller to change the drilling speed during the drilling operation, wherein the program code comprises a process, layer definitions, and material definitions in which the layer definitions defines a set of layers in a stackup for the drilling operation, a change in a reactive thrust force value indicating when a new layer is reached in the set of layers, and a thickness of a layer used to identify a distance for performing the drilling operation when a change in the detected reaction thrust force is not used to control the drilling speed and in which the material definitions defines the drilling speed for a material in the material definitions and a normalized hardness used to identify a layer transition within the set of layers; and wherein the layer definitions include a peck wait thrust value that specifies a distance the drill bit must travel after completing a full peck motion and moving forward in a material before reading another reactive thrust force value from the load sensor.

13. A method for performing a drilling operation on a stackup, the method comprising:
monitoring, by a load sensor, a reactive thrust force value during the drilling operation;
responsive to a change in the reactive thrust force indicating a new layer, identifying the new layer, wherein the new layer becomes a current layer in the drilling operation; and
specifying a distance a drill bit must travel after completing a full peck motion and moving forward in the current layer before reading another reactive thrust force value from the load sensor.

14. The method of claim 13 further comprising:
identifying a current layer in a plurality of layers in the stackup; and
controlling a drilling speed for the drilling operation based on a material in the current layer being drilled.

15. The method of claim 13, further comprising:
ending the drilling operation when all of a plurality of layers has been drilled.

16. The method of claim 14, wherein the controlling step comprises:
controlling a speed at which a spindle turns; and
controlling a speed at which the spindle moves axially.

17. The method of claim 14, wherein the identifying step comprises:
identifying the current layer using layer definitions.

18. The method of claim 14, wherein the controlling steps comprises:
selecting the drilling speed for the material in the current layer from material definitions for the plurality of layers to form a selected drilling speed; and
causing a spindle to move at the selected drilling speed using the selected drilling speed.

19. The method of claim 14 further comprising:
controlling the drilling speed of the drilling operation based on a distance that a drill bit has traveled into the stackup.

20. The method of claim 14, wherein step of controlling the drilling speed comprises:

controlling a speed at which a spindle moves axially to perform a peck operation.

21. A method for performing a drilling operation on a stackup of materials for an aircraft, the method comprising:

identifying a current layer in a plurality of layers in the stackup using layer definitions;

selecting a drilling speed for the materials in the current layer from material definitions for the plurality of layers to form a selected drilling speed;

causing a spindle to move at the selected drilling speed using the selected drilling speed, wherein the drilling speed for the drilling operation based on a material in the current layer being drilled includes a speed at which the spindle turns and controlling a speed at which the spindle moves axially;

monitoring a reactive thrust force during the drilling operation;

responsive to a change in the reactive thrust force indicating a new layer, identifying the new layer, wherein the new layer becomes the current layer in the drilling operation;

specifying a distance a drill bit must travel after completing a full peck motion and moving forward in the current layer before reading another reactive thrust force value from a load sensor;

ending the drilling operation when all of the plurality of layers has been drilled;

controlling the drilling speed of the drilling operation based on a distance that a drill bit has traveled into the stackup if changes in the reactive thrust force are not used to control the drilling speed; and controlling a speed at which the spindle moves axially to perform a peck operation.

* * * * *